United States Patent

Chung et al.

[11] Patent Number: 5,978,829
[45] Date of Patent: Nov. 2, 1999

[54] APPARATUS AND METHODS FOR SHARING IDLE WORKSTATIONS

[75] Inventors: Pi-Yu Chung, Berkeley Heights; Glenn Stephen Fowler, Scotch Plains; Yennun Huang, Bridgewater; Kiem-Phong Vo; Yi-Min Wang, both of Berkeley Heights, all of N.J.

[73] Assignee: A.T. & T. Corporation, New York, N.Y.

[21] Appl. No.: 08/740,908

[22] Filed: Nov. 5, 1996

[51] Int. Cl.$^6$ .................................................. G06F 9/00
[52] U.S. Cl. ........................................ 709/102; 709/105
[58] Field of Search .................................. 395/673, 672; 709/100, 102, 103, 104, 107

[56] References Cited

U.S. PATENT DOCUMENTS 5,031,089  7/1991  Liu .
5,442,791  8/1995  Wrabetz .

OTHER PUBLICATIONS

"The design and Implementation of a Decentralized Scheduling facility for a Workstation Cluster", Stumm, M, Computer Workstations, 1988, proceeding of the 2$^{nd}$ IEEE Conference on Mar. 1988.

Xiaowei Jin, "Dynamic Load Balancing In A Distributed System Using a Sender–Initiated Algorithm", Periodical: LOcal Computer Networks,, 1988 13th Conference.

Yi–Min Wang, Tewnty–Fifth International Symposium on Fault–Tolerant Computing. Digest of Papers, pp. 22–31.

Hwa–Chu Lin, "Performance Study of Dynamic Load Blancing Policies for Distributed Systems with Service Interruption", IEEE/IEE Publication Ondisc.

*Primary Examiner*—Majid A. Banankhah

[57] ABSTRACT

The present invention relates to systems for sharing idle workstation computers that are connected together through a network and shared file system. More particularly, a user of a local host workstation may submit jobs for execution on remote workstations. The systems of the present invention select a remote host that is idle in accordance with a decentralized scheduling scheme and then continuously monitor the activity of the remote host on which the job is executing. If the system detects certain activity on the remote host by one of the remote host's primary users, the execution of the job is immediately suspended to prevent inconvenience to the primary users. The system also suspends job execution if the remote host's load average gets too high. Either way, the suspended job is migrated by selecting another idle remote workstation to resume execution of the suspended job (from the point in time at which the last checkpoint occurred).

35 Claims, 1 Drawing Sheet

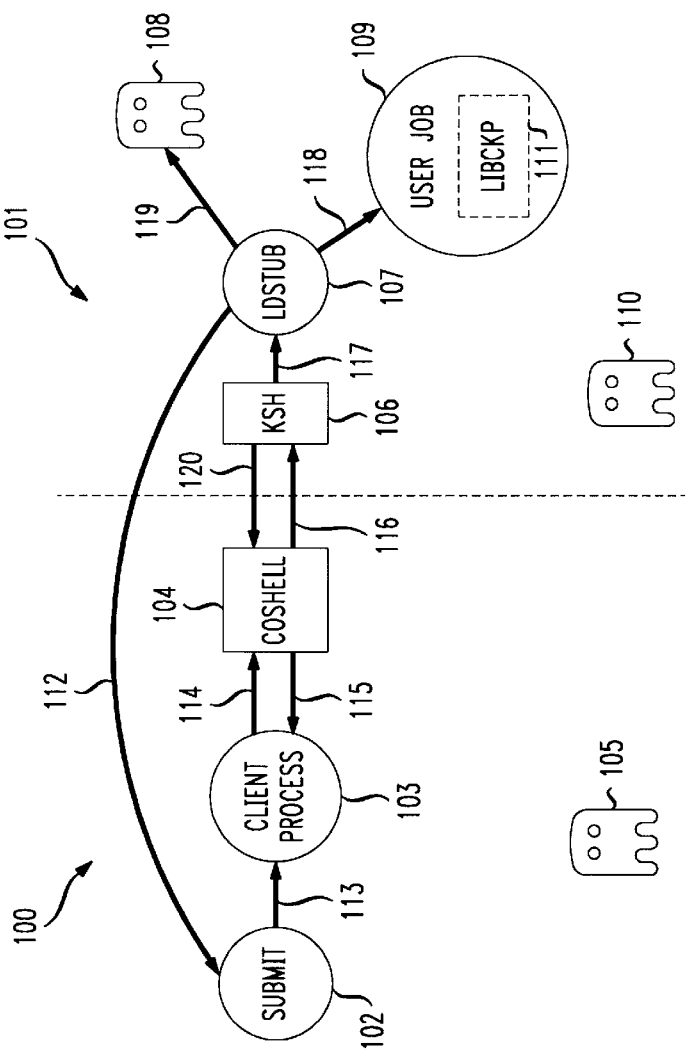

APPARATUS AND METHODS FOR SHARING IDLE WORKSTATIONS

CROSS REFERENCE TO RELATED APPLICATIONS

The present invention is related to the following International Patent Applications: "Persistent State Checkpoint And Restoration Systems," PCT Patent Application No. PCT/US95/07629 (Attorney Docket No.Chung 1-8-5-7-4), and "Checkpoint And Restoration Systems For Execution Control," PCT Patent Application No. PCTJUS95/07660, (Attorney Docket No. Chung 2-9-6-8-5), both of which are assigned to the assignee of the present invention and both of which are incorporated herein by reference. Additionally, the following articles are also incorporated herein by reference: Y. M. Wang et al., "Checkpointing and Its Applications," Symposium on Fault-Tolerant Computing, 1995, and G. S. Fowler, "The Shell as a Service," USENIX Conference Proceedings, June 1993.

BACKGROUND OF THE INVENTION

The present invention relates to networked computer systems. In particular, the present invention relates to computing environments that are populated with networked workstations sharing network file systems. One known system for sharing idle resources on networked computer systems is the Condor system that was developed at the University of Wisconsin (idle resources refer, generally, to a networked workstation having no user input commands for at least a certain period of time). The Condor system is more fully described in M. Litzkow et al., "Condor—a hunter of idle workstations," *Proc. ICDCS*, pp. 104–111, 1988.

Some of the main disadvantages of the Condor system are as follows. Condor uses a centralized scheduler (on a centralized server) to allocate network resources, which is a potential security risk. For example, having a centralized server requires that the server have root privileges in order for it to create processes that impersonate the individual users who submit jobs to it for remote execution. Any lack of correctness in the coding of the centralized server (e.g., any "bugs") may allow someone other than the authorized user to gain access to other user's privileges. Secondly, the Condor system migrates the execution of a job on a remote host as soon as it detects any mouse or keyboard activity (i.e., user inputs) on the remote host. Therefore, if any user, including users other than the primary user, begins using the remote host, shared execution is terminated and the task is migrated. This causes needless migration and its concomitant work lossage. Thirdly, due to the nature of a centralized server, starting the server can only be accomplished by someone with root privileges.

Another known system for accomplishing resource sharing is the Coshell system (which is described more fully in the G. S. Fowler article "The shell as a service," incorporated by reference above). Coshell, unfortunately also has disadvantages, such as the fact that Coshell also suspends a job on the remote host whenever the remote host has any mouse or keyboard activity. Additionally, Coshell cannot migrate a suspended job (a job that was executing remotely on a workstation and was suspended upon a user input at the remote workstation) to another machine, but has to wait until the mouse or keyboard activity ends on the remote host before resuming execution of the job. The fact that Coshell suspends the job's execution in response to any mouse or keyboard activity creates needless suspensions of the job when any mouse or keyboard activity is sensed at the remote host.

It would therefore be desirable to provide systems and methods of more efficiently sharing computational resources between networked workstations.

It would also be desirable to provide program execution on idle, remote workstations in which suspension of the program execution is reduced to further increase processing efficiency.

It would be still further desirable to provide a network resource sharing architecture in which suspended jobs may be efficiently migrated to alternate idle workstations when the initial idle, remote workstation is once again in use by the primary user.

SUMMARY OF THE INVENTION

The above and other objects of the invention are accomplished by providing methods for increasing the efficiency in sharing computational resources in a network architecture having multiple workstations in which at least one of those workstations is idle. The present invention provides routines that, once a job is executing remotely, do not suspend that job unless the primary user "retakes possession" of the workstation (versus any user other than the primary user). Additionally, the present invention provides the capability to migrate a remote job, once it has been suspended, to another idle workstation in an efficient manner, rather than requiring that the job remain on the remote workstation in a suspended state until the remote workstation becomes idle again.

BRIEF DESCRIPTION OF THE DRAWINGS

The above and other objects of the present invention will be apparent upon consideration of the following detailed description, taken in conjunction with the accompanying drawings, in which like reference characters refer to like parts throughout, and in which:

FIG. 1 is an illustrative schematic diagram that depicts substantially all of the processes that are typically active when a single user, on the local host, has a single job running on a remote host in accordance with the principles of the present invention; and FIG. 2 is a table that depicts a representative sample of an attributes file in accordance with the principles of the present invention.

DETAILED DESCRIPTION OF THE INVENTION

FIG. 1 is an illustrative schematic diagram that depicts substantially all of the processes that are typically active when a single user (whom shall be referred to as user X), on the local host, has a single job running on a remote host. FIG. 1 is divided into halves 100 and 101, where half 100 depicts processes 102–105 running on the local host 100, and half 101 depicts processes 106–110 running on a remote host 101. Thus, user X on local host 100 (i.e., the left half of FIG. 1) has a single job 109 running on a remote host 101 (i.e., the right half of FIG. 1).

Hosts 100 and 101 are connected together through a network and share a file system. While FIG. 1 illustrates a network having only two hosts, it should be understood that the techniques of the present invention will typically be used in computing environments where there are multiple hosts, all being networked together, either directly together or in groups of networks (e.g., multiple local area networks, or LANs, or through a wide area network, or WAN), and sharing a file system.

The process by which a user, such as user X, submits a job for execution on a remote host is as follows, as illustrated by reference to FIG. 1. The following example assumes a point in time at which none of the processes described in FIG. 1 have been started. In this illustrative example, the principles of the present invention are applied to the Coshell system that was described and incorporated by reference above.

Initially, a user starts a coshell process (a coshell process is a process that automatically executes shell actions on lightly loaded hosts in a local network) as a daemon process (a process that, once started by a user on a workstation, does not terminate unless the user terminates it) on the user's local host. Thus, in FIG. 1, user X starts coshell process 104 as a daemon process on local host 100. Every coshell daemon process serves only the user who has started it. For example, while another user Y may log onto host 100, only user X can communicate with coshell process 104.

Upon being started, a coshell daemon process starts a status daemon (unless a status daemon is already running), on its own local host, and on every other remote host to which the coshell may submit a job over the network. In the case of FIG. 1, coshell 104 has started status daemon 105 running on host 100 and status daemon 110 running on host 101.

Each status daemon collects certain current information regarding the host it is running on (i.e., status daemon 105 collects information about host 100, while status daemon 110 collects information about host 101) and posts this information to a unique status file which is visible to all the other networked hosts. This current information comprises: (i) the one minute load average of the host as determined by the Unix command uptime, and (ii) the time elapsed since the last activity on an input device, either directly or through remote login, by a primary user of the host. All of the status files of all the status daemons are kept in a central directory. A central directory is used to reduce the network traffic that would otherwise occur if, for example, every status daemon had to post its current information to every other host on the network. In particular, a central directory of status files causes the network traffic to scale linearly with the number of hosts added. Furthermore, each status daemon posts its current information every 40 seconds plus a random fraction of 10 seconds—the random fraction is intended to further relieve network congestion by temporarily distributing the posting of current information. A coshell uses these status files to select an appropriate remote host upon which to run a job submitted to it by the coshell's user.

Each coshell selects a remote host independently of all of the other coshells that may be running and is therefore said to implement a form of decentralized scheduling. The coshells avoid the possibility of all submitting their jobs to the same remote host by having a random smoothing component in their remote host selection algorithm. Rather than choosing a single best remote host, each coshell chooses a set of candidate remote hosts and then picks an individual host from within that set randomly.

A coshell chooses a set of candidate remote hosts based upon the current information in the status files and the static information in an attributes file. There is a single attributes file shared by all the coshells. For each host capable of being shared by the present invention, the attributes file typically stores the following attributes: type, rating, idle, mem and puser. An illustrative example of an attributes file is shown in the table of FIG. 2. Each line of FIG. 2 contains, from left to right, the host name followed by assignments of values to each of the attributes for that host.

The type attribute differentiates between host types. For example, the "sgi.mips" in line 1 of FIG. 2 indicates a host of the Silicon Graphics workstation type, while "sun4" indicates a Sun Microsystems workstation type. The rating attribute specifies the speed for a host in MIPS (millions of instructions per second). All hosts have preferably had their MIPS rating evaluated according to a common benchmark program. This ensures the validity of MIPS comparisons between hosts. The idle attribute specifies the minimum time which must elapse since the last primary user activity on a host (as posted in the host's status file) before the present invention can use the host as a remote host. The mem attribute describes the size (in megabytes) of the main memory of the host, while the puser attribute describes the primary users of the host. For example, host "banana" of FIG. 2 has two primary users indicated by the quoted list "emerald ymwang," while host "orange" only has the primary user "ruby" (no quotes are necessary when there is only one primary user).

In general, the primary users attribute of a host is simply a subset of the universe of potential users of the host, selected as primary because they should be accorded extra priority in having access to the host's resources.

Typically, if the host is physically located in a particular person's office, then the primary users of that host would include the occupant of that office as well as any administrative assistants to the occupant. For certain computer installations, it is possible to ascertain the occupant of the office containing the host from the name of the home directory on the host's physically attached disk. The names of these home directories can be collected automatically, over the network, thereby making it easier to create and maintain an attributes file.

In addition to, or as an alternative to, the occupant of an office containing the host, the primary users of a host may include anyone who logs into the host from the host's console (where the console comprises the keyboard and video screen which are physically attached to the host).

Included among any other qualifications required of a remote host for it to be included in the set of candidate remote hosts chosen by a coshell, is the requirement that the remote host be idle. A remote host is considered idle if all of the following three conditions are satisfied: (i) the one minute load average (as posted in the host's status file) is less than a threshold (with the threshold typically being approximately 0.5); (ii) the time elapsed since the last primary user activity (as posted in the host's status file) is less than the period of time specified for the host by the idle attribute in the attributes file (where the period of time is typically approximately 15 minutes); and (iii) no nontrivial jobs are being run by a primary user of the remote host.

A nontrivial job is typically determined as follows. The Unix command "ps" (which means processor status) is executed periodically with the execution of the two ps commands separated from each other by about one minute. An execution of the ps command returns, for each process on the host, a flag indicated whether or not the process was running as of the time theps command was executed. If for both executions ofps the flags for a process indicate that the process was running, then the process is nontrivial. If a process is indicated as having stopped, for at least one of the two ps executions, then the process is considered trivial.

Once a user has a coshell daemon running, the user can start a particular job running on a remote host by starting a submit program. The submit program takes as arguments the job's name as well as any arguments which the job itself requires. The job name can identify a system command, application program object file or a shell script. The job name can also be an alias to any of the items listed in the previous sentence. In FIG. 1, user X has started submit process 102 running with the name for job 109 as an argument. A submit process keeps running until the job passed to it has finished executing on a remote host. Therefore, submit process 102 keeps running until job 109 is finished.

If, for example, user X wants to run another job remotely, user X will have to start another submit process. Each such submit process keeps running until the job passed to it as an argument has finished executing on its remote host. Thus, there may be several submit processes running at the same time for the same user on a given local host (e.g., on local host 100).

The first action a submit process takes upon being started is to spawn a coshell client process. For example, submit process 102 has started client process 103 through spawning action 113. As used throughout the present application, spawning refers to the general process by which a parent process (e.g., submit process 102) creates a duplicate child process (e.g., client process 103). In Unix, the spawning action is accomplished by the fork system call. A client process provides an output on the local host for the standard error and standard output of the job executing on a remote host. A client process also has two way communication with its coshell via command and status pipes. Client process 103 receives the standard error and the standard output of job 109. In addition, client process 103 communicates with its coshell 104 via command pipe 114 and status pipe 115.

Once the client process has been started, its coshell then proceeds to select a remote host upon which to run the submitted job. As discussed above, each coshell selects a remote host independently of all the other coshells and utilizes random smoothing to prevent the overloading of any one remote host. If there are no idle remote hosts for a coshell to execute a submitted job upon, the coshell will queue the job until an idle remote host becomes available. Coshell 104, in the example shown in FIG. 1, has selected idle remote host 101 to run the submitted job.

Having selected a remote host, the coshell next starts a shell on the remote host—unless the coshell already has a shell running on that remote host left over from a previous job submission by that coshell to that same remote host. Assuming that the coshell does not already have a shell running on the selected remote host, it will start one with the Unix command rsh. A coshell has two way communication with the shell it has created via a command pipe and a status pipe. In FIG. 1, coshell 104 has started a shell ksh 106 on remote host 101. Coshell 104 and ksh 106 communicate via command pipe 116 and status pipe 120.

It should be noted that the type of shell started on a remote host by a coshell, referred to as a ksh, differs from an ordinary Unix shell only in its ability to send its standard output and standard error (produced by a remotely submitted job) over the network and back to its coshell. The coshell then routes this standard output and standard error to the correct client process. In the case of FIG. 1, the standard output and standard error of job 109, which is running in ksh 106, is sent over the network to coshell 104. Coshell 104 then routes this standard output and standard error to client process 103.

Once a ksh is running on the selected remote host, a program called LDSTUB is started under the ksh. An LDSTUB process is started under the ksh for each job, from the ksh's coshell, which is to be executed on the selected remote host. In the case of FIG. 1, LDSTUB process 107 is started under ksh 106. Upon being started, the LDSTUB process begins the execution of the user's job and a monitor daemon by spawning both of them off. Thus, LDSTUB process 107 has started monitor daemon 108 through spawn 119 and has started user X's job 109 through spawn 118.

A monitor daemon is a fine-grain polling process. It checks for the following conditions on the selected remote host: (i) any activity on an input device, either directly or through remote login, by a primary user of the selected remote host; (ii) any nontrivial jobs being run by a primary user of the selected remote host; or (iii) a one minute load average on the selected remote host (as determined by the monitor daemon itself running the Unix command uptime) which is equal to or greater than a particular threshold (typically the threshold is about 3.5). A monitor daemon is a fine-grain polling process because it frequently checks for the above three conditions, typically checking every 10 seconds. If one or more of the above three conditions is satisfied, the monitor daemon sends a signal to its LDSTUB process. This signal to its LDSTUB process starts a process, described below, which migrates the user's job to another remote host. In the example shown in FIG. 1, monitor daemon 108 checks for each of the above three conditions on remote host 101.

The user's job is usually run on the remote host having been already linked with the Libckp checkpointing library. Libckp is a user-transparent checkpointing library for Unix applications. Libckp can be linked with a user's program to periodically save the program state on stable storage without requiring any modification to the user's source code. The checkpointed program state includes the following in order to provide a truly transparent and consistent migration: (i) the program counter; (ii) the stack pointer; (iii) the program stack; (iv) open file descriptors; (v) global or static variables; (vi) the dynamically allocated memory of the program and of the libraries linked with the program; and (vii) all persistent state (i.e., user files). User x's job 109, in this example, has been linked with Libckp library 111.

Each of the processes shown in FIG. 1, namely processes 102–110, are active at this point in the job submission process.

Up to this point in the description of the job submission process, the focus has been on presenting the process by which a single job is submitted for remote execution by a single user. It should be noted, however, that a user of a local host may start a second job running on a remote host before the first submitted job has finished executing. This second job submission is coordinated with the processes already running for the first job submission as follows.

First, the user starts the submit program a second time with the second job name as an argument (in the same manner as described above for the first job). This second starting of the submit program creates a second submit process just for managing the remote execution of the second job. The second submit process spawns a second coshell client process (similar to coshell process 104) which is also just for the remote execution of the second job. The second coshell client process, however, communicates with the same coshell which the first coshell client process communicates with.

The second coshell then selects a remote host for the second job to execute upon and starts a ksh on that remote host—unless the coshell already has a ksh running on that remote host. For example, if the coshell chooses the same remote host upon which the first job is executing, then the coshell will use the same ksh in which the first job is executing. Regardless of whether the coshell needs to create a new ksh or not, within the selected ksh a second LDSTUB process, just for the remote execution of the second job, is started. The second LDSTUB process spawns the second job and a second monitor daemon.

In general then, it can be seen that if a user has N jobs remotely executing which have all been submitted from the same local host, then the user will have a unique set of submit, client, LDSTUB, monitor daemon and job processes created for each of the N jobs submitted. All of the N jobs will share the same coshell daemon. Any of the N jobs executing on the same remote host will share the same ksh.

The remainder of this description addresses the operation of the present invention with respect to a single remotely executing job for one user of a local host. For any additional remotely executing jobs submitted by the same user from the same local host, each such additional job will have its own unique set of independent processes which will respond to conditions in the same manner as described below.

At the point in the job submission process when a user's job is remotely executing, one of two main conditions will occur: (i) one or more of the three conditions described above as being checked for by a monitor daemon is satisfied causing the user's job to be migrated to another remote host; or (ii) the remotely executing job will finish. The process is initiated, at this point in the job submission process, by each of these two main conditions occurring as described, in turn, below.

If the first main condition (which may be one or more of the three conditions checked for by a monitor daemon occurring) is satisfied, the following steps will occur in order to migrate the user's job to another remote host. Each of these steps will be explicated by reference to the specific process configuration of FIG. 1.

First, the satisfaction of the first main condition causes the monitor daemon to exit. The exiting of the monitor daemon causes a "SIGCHLD" signal to be sent to its parent LDSTUB process. In FIG. 1, the exiting of monitor daemon 108, upon the satisfaction of the first main condition, causes a "SIGCHLD" signal to be sent to monitor daemon 108's parent process LDSTUB 107.

Second, the LDSTUB process kills the user's job. In FIG. 1, LDSTUB process 107 kills user X's job 109. If the user's job has been linked with Libckp, as is the case for job 109, a subsequent restart of the job will only mean that work since the last checkpoint is lost. Typically, Libckp performs a checkpoint every 30 minutes so that only the last 30 minutes of job execution, at most, will be lost.

The third step is as follows. There is a socket connection between an LDSTUB process and its submit process. Over this socket connection the LDSTUB process sends a message to its submit process telling it to have the user's job run on another remote host. LDSTUB process 107 sends such a message over socket 112 to submit process 102.

In the fourth step, the submit process kills the client process it had originally spawned off to communicate with the remote job through coshell. The submit process also kills its LDSTUB process. In the case of FIG. 1, submit process 102 kills client process 103 and LDSTUB process 107.

In the fifth step, the submit process resubmits the user's job to another remote host according to the submission process described above. Submit process 102 resubmits job 109 to coshell 104 for execution on another remote host. The subsequent processes and the other remote host which would be a part of job 109's resubmission are not shown in FIG. 1. When the user's job is executed on another remote host, the first action of the job is to check for a checkpoint file. If the job finds a checkpoint file it restores the state of the job as of the point in time of the last checkpoint.

It is important to note that the ksh under which the user's job had been running, along with its pipe connections to its coshell, is kept running. This ksh may be used again later by its coshell provided that the remote host upon which the ksh is running becomes idle again by satisfying the three conditions described above for a candidate remote host. In the case of FIG. 1, ksh 106 is kept running along with its command pipe 116 and status pipe 120 connections to coshell 104.

Alternatively, if the second main condition described above (of the remotely executing job finishing) is satisfied, the following steps will occur. As with the first main condition, each of these steps will be explicated by reference to the specific process configuration of FIG. 1.

First, when the user's job finishes execution on a remote host, it exits causing a "SIGCHLD" signal to be sent to its parent process (its LDSTUB process). In response to receiving the "SIGCHLD" signal, LDSTUB obtains the exit status number (a status number is returned by every exiting Unix process to indicate its completion status) of the user's job with the Unix system call wait(2). When user X's job 109 finishes execution on remote host 101 it exits causing a "SIGCHLD" signal to be sent to its parent LDSTUB process 107. LDSTUB process 107 then obtains job 109's exit status number with the wait(2) system call.

Second, the LDSTUB process kills its monitor daemon. LDSTUB process 107 kills monitor daemon 108.

The third step is as follows. There is a socket connection between the LDSTUB process and its submit process. Over this socket connection the LDSTUB process sends a message to its submit process telling it that the user's job has finished and containing the status number returned by the user's job. LDSTUB process 107 sends such a message over socket 112 to submit process 102.

In the fourth step, the submit process kills the client process it had originally spawned off to communicate with the remote job through coshell. The coshell then detects that a particular client process has been killed by a particular signal number. In response to detecting this the coshell sends a message to the appropriate ksh. The message sent by the coshell instructs the ksh to kill the LDSTUB process, corresponding to the submit process, using the same signal number by which the submit process killed its client process. In the case of FIG. 1, submit process 102 kills client process 103. Coshell 104 then detects that client process 103 has been killed by a particular signal number. In response to detecting this, coshell 104 sends a message to ksh 106. The message sent by coshell 104 instructs ksh 106 to kill LDSTUB process 107 with the same signal number by which submit process 102 killed client process 103.

In the fifth step, the submit process exits with the same status number returned by the remotely executed job. Submit process 102 exits with the status number returned by the execution of job 109 on remote host 101.

As with the migration process described above, it is important to note that the ksh under which the user's job had been running, along with its pipe connections to its coshell, is kept running. This ksh may be used again later by its coshell provided that the remote host upon which the ksh is running becomes idle again by satisfying the three conditions described above for a candidate remote host. In the case of FIG. 1, ksh 106 is kept running along with its command pipe 116 and status pipe 120 connections to coshell 104.

The workstations shared through the present invention can be all of one type (homogeneous workstations). An example is a network where only Sun Microsystems workstations can be shared. Alternatively, the present invention can be used to share a variety of workstation types (heterogeneous workstations). An example is a network where both Sun Microsystems workstations and Silicon Graphics workstations can be shared.

Where the present invention is used with heterogeneous workstations, the migration of a job, based upon workstation type, is typically as follows. Where no type is specified upon submitting a job, the job is limited to migrate among workstations of the same type as which the job was submitted from. The user can specify however, upon submitting a job, that the job only be executed upon workstations of one particular type and this type need not be the same as the type of workstation from which the job was submitted. The user can also specify, upon submitting a job, that the job can be executed on any workstation type.

Persons skilled in the art will appreciate that the present invention may be practiced by other than the described embodiments, which are presented for purposes of illustration and not of limitation, and the present invention is limited only by the claims which follow.

We claim:

1. A system for sharing computer resources among a plurality of computers connected together by a network, comprising:
    a local computer that accepts jobs for remote execution, the local computer being one of the plurality of computers;
    a remote computer that is capable of receiving jobs for remote execution, the remote computer being one of the plurality of computers and executing a current status process to collect current activity information about primary users of the remote computer; and
    a scheduling computer that chooses a location for remote execution of the accepted jobs based upon at least the remote computer's primary user current activity information, the scheduling computer being one of the plurality of computers.

2. The system of claim 1, wherein the scheduling computer and the local computer are the same computer.

3. The system of claim 1, wherein the scheduling computer and the remote computer are the same computer.

4. The system of claim 1, wherein the local computer, the remote computer and the scheduling computer are three different computers of the plurality of computers.

5. The system of claim 1, wherein the scheduling computer capability of choosing a location for remote execution is executed as a decentralized scheduling process among the plurality of computers.

6. The system of claim 1, wherein the local computer executes a submission process in response to a job being submitted for remote execution by a user of the local computer.

7. The system of claim 1, wherein the remote computer also executes:
    a monitor process that monitors the activity of primary users of the remote computer.

8. The system of claim 1, wherein the activity information includes time elapsed since a last activity on an input device by a primary user of the remote computer.

9. The system of claim 8, wherein the input device is directly connected to the remote computer.

10. The system of claim 8, wherein the input device is connected to the remote computer through a remote login process.

11. The system of claim 1, wherein the scheduling computer chooses a remote computer as the computer to remotely execute a job only if the time elapsed since a last activity on the input device by a primary user of the remote computer is greater than a predetermined threshold.

12. The system of claim 1, further comprising a file system shared by at least the local and remote computers.

13. The system of claim 12, wherein a primary user of the remote computer is determined by attribute information stored in a central location in the file system.

14. The system of claim 13, wherein the scheduling computer chooses a location based on current information kept in the file system and the current activity status process on each remote computer posts the current information it collects to the central location in the file system.

15. A system for sharing computer resources among a plurality of computers connected together by a network, comprising:
    a local computer that accepts jobs that a user has submitted to the local computer for execution on a remote computer; and
    a remote computer, selected by a scheduling process, that executes the job submitted by the user, and executes a monitor process that causes the execution of the job to be suspended if the monitor process detects activity on the remote computer by a primary user of the remote computer.

16. The system of claim 15, wherein the remote computer suspends execution of the job if activity by a primary user of the remote computer is detected on an input device of the remote computer.

17. The system of claim 15, wherein the local computer executes a submission process such that if the job is suspended by the remote computer, the job is resubmitted by the submission process to the scheduling process for execution on a second remote computer.

18. The system of claim 15, wherein the monitor process is spawned from a parent process.

19. The system of claim 15, wherein the monitor process is a fine-grain polling process.

20. The system of claim 15, wherein the job is linked with a checkpointing library.

21. The system of claim 15, further comprising a file system shared by at least the local and remote computers.

22. The system of claim 21, wherein a primary user of the remote computer is determined by attribute information stored in a central location in the file system.

23. The system of claim 15, wherein the scheduling process is a decentralized scheduling process.

24. The system of claim 23, wherein the decentralized scheduling process is executed on the local computer that submits a job for remote execution.

25. The system of claim 15, wherein the scheduling process is executed by a single processor for the entire network.

26. A method of sharing computer resources among a plurality of computers connected together by a network comprising the steps of:
    accepting jobs for remote execution on a first computer;
    executing a scheduling process to schedule the remote execution of the accepted jobs based on current activity information about each of the plurality of primary users of each of the computers that may be remotely accessed; and
    running a current status process on at least one second computer of the plurality of computers, the second computer being one of the remotely accessible computers, the current status process operating to collect current activity information about primary users of the second computer.

27. The method of claim 26, further comprising the step of:

executing a submission process on the first computer in response to a job being submitted by a user of the first computer.

28. The method of claim 26, wherein the step of running a current status process collects activity information that includes time elapsed since a last activity on an input device by a primary user of the second computer.

29. The method of claim 26, wherein the step of executing a scheduling process chooses a remote computer for remote execution of the submitted job only if the time elapsed since a last activity on an input device by a primary user of the remote computer is greater than a predetermined threshold, the remote computer being one of the second computers.

30. The method of claim 29, further comprising the steps of:

executing one of the accepted jobs on the remote computer chosen by the scheduling process; and monitoring the remote computer for activity by a primary user of the remote computer.

31. The method of claim 30, further comprising the step of:

suspending the remote execution of the job when activity by a primary user is sensed during the step of monitoring.

32. The method of claim 31, further comprising the step of:

resubmitting the suspended job to the scheduling process for execution on a different remote computer when activity by a primary user is sensed during the step of monitoring.

33. The method of claim 30, further comprising the step of:

linking the job to a checkpointing library prior to executing the job. scheduling process is executed as a decentralized scheduling process.

34. The method of claim 26, wherein the step of executing a scheduling process is executed as a decentralized scheduling proceess.

35. The method of claim 26, wherein the step of executing a scheduling process is executed as a centralized scheduling process on a single processor.

* * * * *